(12) United States Patent
Wu et al.

(10) Patent No.: US 11,644,639 B2
(45) Date of Patent: May 9, 2023

(54) PRISM DRIVING DEVICE (71) Applicant: Lanto Electronic Limited, Kunshan (CN)

(72) Inventors: Fuyuan Wu, Kunshan (CN); Yaobang Guo, Kunshan (CN); Shengwen Sun, Kunshan (CN); Bingbing Ma, Kunshan (CN); Jie Du, Kunshan (CN); Shangyu Hsu, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 198 days.

(21) Appl. No.: 17/204,232

(22) Filed: Mar. 17, 2021

(65) Prior Publication Data
US 2022/0019052 A1 Jan. 20, 2022

(30) Foreign Application Priority Data
Jul. 20, 2020 (CN) .......................... 202010695759.1

(51) Int. Cl.
G02B 7/18 (2021.01)
G02B 27/64 (2006.01)
G03B 5/00 (2021.01)

(52) U.S. Cl.
CPC ........... *G02B 7/1805* (2013.01); *G02B 27/64* (2013.01); *G03B 5/00* (2013.01)

(58) Field of Classification Search
None
See application file for complete search history.

(56) References Cited

U.S. PATENT DOCUMENTS

| 2012/0182472 A1* | 7/2012 | Inata | ........................ | G03B 5/00 |
| | | | | 348/E5.026 |
| 2015/0002683 A1* | 1/2015 | Hu | ........................ | G02B 26/085 |
| | | | | 348/208.11 |

(Continued)

FOREIGN PATENT DOCUMENTS

| CN | 102483557 A | 5/2012 |
| CN | 205942054 U | 2/2017 |

(Continued)

OTHER PUBLICATIONS

First Office Action issued in Chinese Application No. 202010695759.1, dated Sep. 3, 2020.

(Continued)

*Primary Examiner* — Derek S. Chapel
(74) *Attorney, Agent, or Firm* — Birch, Stewart, Kolasch & Birch, LLP (57) ABSTRACT Provided is a prism driving device. The prism driving device includes a housing assembly, a prism holder disposed on the housing assembly in an angle adjustable manner, and an electromagnetic driving assembly. The electromagnetic driving assembly includes a magnet portion and a coil portion disposed opposite the magnet portion, where one of the magnet portion or the coil portion is disposed on the prism holder, the other one is disposed on the housing assembly, and the electromagnetic driving assembly is configured to adjust a tilt angle of the prism holder. One of the housing assembly or the prism holder is provided with a support protrusion and the other is provided with a groove, and at least a portion of the support protrusion is magnetically sucked into the groove.

20 Claims, 6 Drawing Sheets (56) References Cited

U.S. PATENT DOCUMENTS

| | | | | |
|---|---|---|---|---|
| 2018/0109660 A1* | 4/2018 | Yoon | ............... | G02B 13/0035 |
| 2019/0146238 A1* | 5/2019 | Chan | ............... | H04N 5/23296 |
| | | | | 348/208.1 |
| 2020/0257132 A1* | 8/2020 | Im | ............... | G02B 7/08 |
| 2020/0363626 A1* | 11/2020 | Seo | ............... | G03B 30/00 |
| 2020/0379243 A1* | 12/2020 | Li | ............... | G02B 23/08 |
| 2020/0412958 A1* | 12/2020 | Li | ............... | G02B 7/1805 |
| 2021/0063679 A1* | 3/2021 | Park | ............... | G03B 3/10 |
| 2022/0137327 A1* | 5/2022 | Washio | ............... | G02B 7/1805 |
| | | | | 359/221.2 |
| 2022/0263981 A1* | 8/2022 | Park | ............... | G03B 5/02 |
| 2022/0272238 A1* | 8/2022 | Jang | ............... | H04N 5/2254 |

FOREIGN PATENT DOCUMENTS

| | | |
|---|---|---|
| CN | 108338806 A | 8/2018 |
| CN | 110261990 A | 9/2019 |
| CN | 110488452 A | 11/2019 |
| CN | 209624869 U | 11/2019 |
| CN | 110967803 A | 4/2020 |
| TW | 201939151 A | 10/2019 |
| WO | WO 2014/192464 A1 | 12/2014 |
| WO | WO 2018/035944 A1 | 3/2018 |

OTHER PUBLICATIONS

Second Office Action issued in Chinese Application No. 202010695759 1. dated Sep. 21, 2020.

Third Office Action issued in Chinese Application No. 202010695759. 1, dated Oct. 12, 2020.

* cited by examiner

PRISM DRIVING DEVICE

CROSS-REFERENCE TO RELATED APPLICATION

This application claims priority to Chinese Patent Application No. 202010695759.1 filed Jul. 20, 2020, the disclosure of which is incorporated herein by reference in its entirety.

TECHNICAL FIELD

The present disclosure relates to the field of camera technologies of electronic products and, in particular, to a prism driving device.

BACKGROUND

Currently, electronic products, such as mobile phones, are provided with cameras, and the cameras all have the functions of optical reflection and two-axis optical image stablization (OIS) so that photos taken by a user can be clearer. In addition, a camera driving device is used for driving a lens or a prism to move so that the optical image stablization function can be achieved.

In the related art, the camera driving device includes at least a voice coil motor and a prism driving device. The voice coil motor is used for driving a focusing lens and a zoom lens in the camera to move, and the prism driving device is used for driving a prism (that is, a reflector) in the camera to move. Specifically, the prism driving device generally includes a holder used for supporting the prism, a drive structure used for driving the holder to tilt, and an elastic piece used for preventing the prism from shaking. The elastic piece is disposed below the holder and has functions of bearing the holder, fixing a position of the holder, acting as a rotating shaft fulcrum and the like.

In order to better achieve the optical image stablization function, a plurality of elastic pieces usually need to be disposed below the holder, resulting in that the prism driving device needs a relatively large space to accommodate the plurality of elastic pieces and thus the prism driving device has a relatively large overall size and is difficult to achieve miniaturization. Moreover, the elastic pieces are easy to fracture during use, leading to a failure of a function of the elastic pieces, and thus leading to a failure of the optical image stablization function of the prism driving device.

SUMMARY

The present disclosure provides a prism driving device. The prism driving device may occupy a relatively small space, and a support protrusion and a groove in the prism driving device are not easy to fracture.

As conceived above, solutions adopted by the present disclosure are described below.

A prism driving device includes a housing assembly, a prism holder and an electromagnetic driving assembly.

The prism holder is disposed on the housing assembly in an angle adjustable manner.

The electromagnetic driving assembly includes a magnet portion and a coil portion disposed opposite to the magnet portion. One of the magnet portion or the coil portion is disposed on the prism holder, the other one is disposed on the housing assembly, and the electromagnetic driving assembly is configured to adjust a tilt angle of the prism holder.

One of the housing assembly or the prism holder is provided with a support protrusion, and the other of the housing assembly and the prism is provided with a groove. At least a portion of the support protrusion is magnetically sucked into the groove, and the prism holder is capable of being universally moved relative to the housing assembly through the support protrusion and the groove which are in contact with each other.

In an embodiment, the prism holder includes a holder body and a support structure disposed below the holder body, a gap is present between the holder body and the housing assembly, and one of the support protrusion or the groove is disposed on a side surface of the support structure facing away from the holder body.

In an embodiment, the housing assembly includes a base plate and a shell disposed on the base plate, the support protrusion is disposed on the base plate, and the groove is disposed on the side surface of the support structure facing away from the holder body.

In an embodiment, the support structure is a magnet, the base plate is a metal plate, and the support protrusion and the base plate are integrally formed.

In an embodiment, a position of a gravity center of the holder body is provided with an accommodating groove, and the support structure is fixed in the accommodating groove.

In an embodiment, at least one of a top surface of the support protrusion or a groove bottom surface of the groove is a cambered surface.

In an embodiment, the top surface includes a first top surface and a second top surface, and a size of the first top surface is larger than a corresponding size of the second top surface; the groove bottom surface includes a first bottom surface and a second bottom surface, and a size of the first bottom surface is larger than a corresponding size of the second bottom surface; and the first top surface is capable of being sucked into the first bottom surface, and the second top surface is capable of being sucked into the second bottom surface.

In an embodiment, the holder body is provided with a plurality of weight reduction slots, and weight reduction slots located at one end of the holder body are symmetrically disposed with weight reduction slots located at the other end of the holder body.

In an embodiment, the electromagnetic driving assembly surrounds the prism holder.

In an embodiment, the prism driving device further includes a flexible circuit board, where the electromagnetic driving assembly includes a plurality of magnet portions and a plurality of coil portions, and the plurality of coil portions are disposed in the flexible circuit board.

In an embodiment, the flexible circuit board includes a first board piece and two second board pieces respectively connected to two ends of the first board piece, the first board piece is disposed at a rear side of the prism holder, the two second board pieces are respectively disposed at a left side and a right side of the prism holder, and the first board piece and the two second board pieces are both provided with the plurality of coil portions.

In an embodiment, the flexible circuit board further includes a connecting plate which bends and extends from a lower edge of the second board piece, and a surface of the connecting plate arranges a row of gold fingers.

REFERENCE LIST 1 housing assembly
11 base plate
12 shell
2 prism holder
21 holder body
211 accommodating groove
212 weight reduction slot
213 magnet groove
214 stop block
22 support structure
3 electromagnetic driving assembly
31 magnet portion
32 coil portion
4 support protrusion
41 top surface
411 first top surface
412 second top surface
5 groove
51 groove bottom surface
511 first bottom surface
512 second bottom surface
6 flexible circuit board
61 first board piece
62 second board piece
63 connecting plate
631 gold finger
7 Hall effect detector
10 prism driving device
20 voice coil motor
30 prism

DETAILED DESCRIPTION

The solution of the present disclosure is further described in conjunction with accompanying drawings and specific embodiments. It is to be understood that the embodiments set forth below are intended to illustrate and not to limit the present disclosure.

In the description of the present disclosure, it is to be noted that the orientational or positional relationships indicated by terms "center", "above", "below", "left", "right", "vertical", "horizontal", "inside", "outside" and the like are based on the orientational or positional relationships illustrated in the drawings, which are for the mere purpose of facilitating and simplifying the description of the present disclosure, and these relationships do not indicate or imply that the device or component referred to has a specific orientation and is constructed and operated in a specific orientation, and thus it is not to be construed as limiting the present disclosure. Moreover, terms like "first" and "second" are merely used for the description and are not to be construed as indicating or implying relative importance.

In the description of the present disclosure, it should be noted that unless otherwise expressly specified and limited, terms like "mounted", "connected to each other", "connected" are to be construed in a broad sense, for example, as permanently connected, detachably connected; mechanically connected or electrically connected; directly connected or indirectly connected via an intermediate medium; or internally connected between two elements. For those of ordinary skill in the art, the above terms can be construed according to specific circumstances in the present disclosure.

Figure 1:
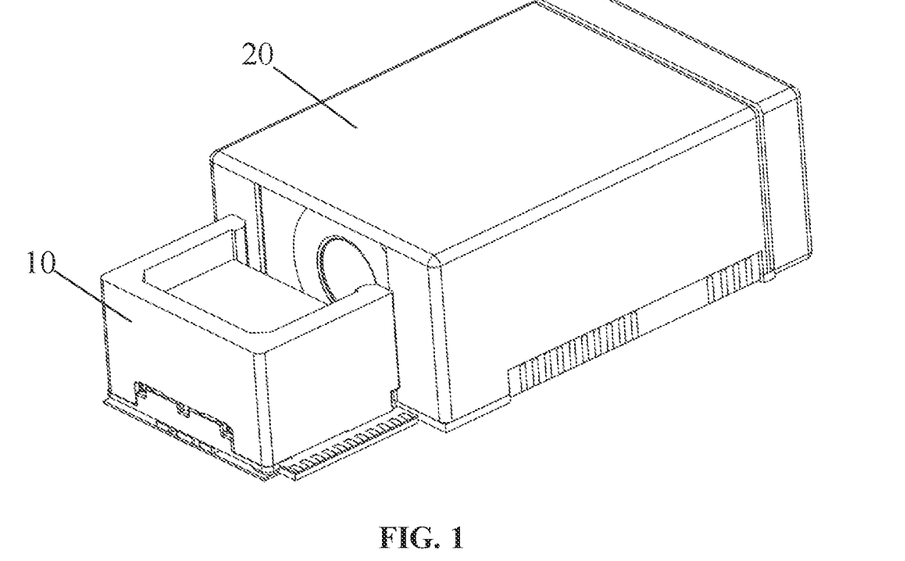
FIG. 1 is a structure view of a camera driving device according to an embodiment of the present disclosure.
Figure 2:
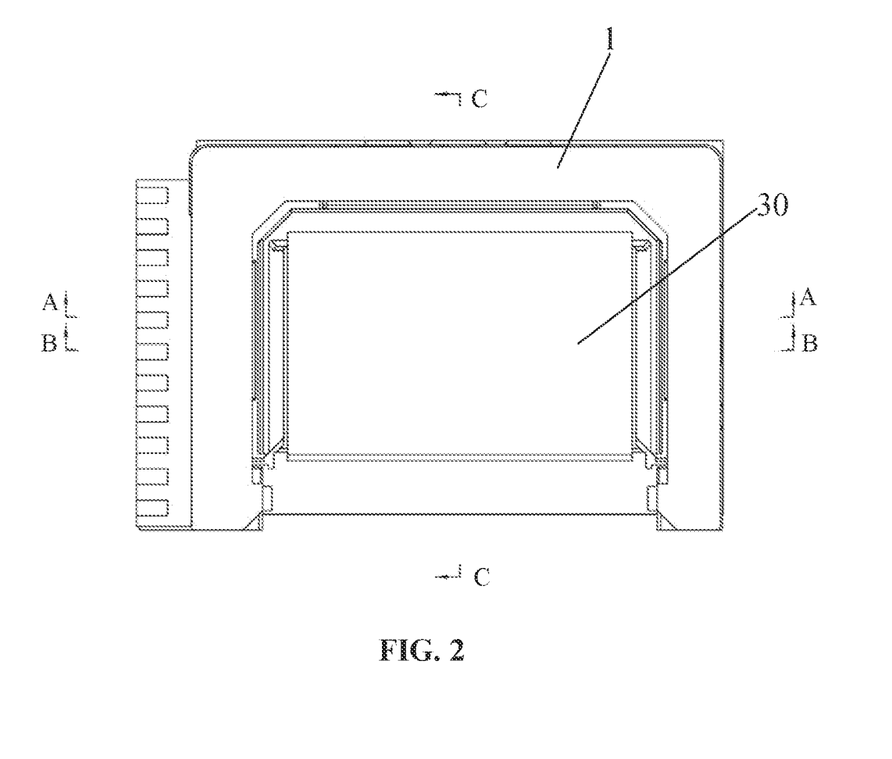
FIG. 2 is a top view of a prism driving device according to an embodiment of the present disclosure.

This embodiment provides a prism driving device 10 which can be applied to a periscopic camera module. The prism driving device 10 does not need to be provided with a plurality of elastic pieces, so that the prism driving device 10 has a relatively small size and occupies a relatively small space. When the prism driving device 10 is disposed in a camera driving device, as shown in FIG. 1, since a size of a voice coil motor 20 is constant, when the prism driving device 10 is relatively small, the camera driving device can be relatively small.

As shown in FIG. 2 to FIG. 9, the prism driving device 10 includes a housing assembly 1, a prism holder 2 and an electromagnetic driving assembly 3. The prism holder 2 is disposed on the housing assembly 1 in an angle adjustable manner so that an angle of a prism 30 disposed on the prism holder 2 can be adjusted. The electromagnetic driving assembly 3 is disposed on the housing assembly 1 and the prism holder 2, and the electromagnetic driving assembly 3 is configured to adjust a tilt angle of the prism holder 2. Optionally, the electromagnetic driving assembly can drive the prism holder 2 to move such that the prism holder 2 is tilted at a preset angle with respect to the housing assembly 1, and thereby the prism 30 can be adjusted.

In addition, one of the housing assembly 1 or the prism holder 2 is provided with a support protrusion 4, and the other one of the housing assembly 1 or the prism holder 2 is provided with a groove 5. That is, the housing assembly 1 is provided with the support protrusion 4, and the prism holder 2 is provided with the groove 5; or the housing assembly 1 is provided with the groove 5, and the prism holder 2 is provided with the support protrusion 4. A shape of the support protrusion 4 is consistent with a shape of the groove 5, and a size of the support protrusion 4 can be similar to a size of the groove 5, so that at least a portion of the support protrusion 4 can be sucked into the groove 5, that is, the support protrusion 4 is magnetically connected to the groove 5. The prism holder 2 is capable of being universally moved relative to the housing assembly 1 through the support protrusion 4 and the groove 5 which are in contact with each other under the drive of the electromagnetic driving assembly 3. Optionally, the support protrusion 4 may be magnetically connected to the groove 5 in many modes. For example, both the support protrusion 4 and the groove 5 are magnets; or one of the support protrusion 4 or the groove 5 is a magnet, and the other one of the support protrusion 4 or the groove 5 is a metal which can be attracted by the magnet. The magnetic attraction connection between the support protrusion 4 and the groove 5 enables the prism holder 2 to be in contact with the housing assembly 1 in the prism driving device 10 under any usage scenario.

In the prism driving device 10 provided by this embodiment, the support protrusion 4 and the groove 5 are provided such that the universal movement of the prism holder 2 relative to the housing assembly 1 can be achieved, thereby achieving the purpose of preventing hand shaking. Since the support protrusion 4 can be inserted into the groove 5, the support protrusion 4 and the groove 5 can occupy a relatively small space, which is beneficial to miniaturization of the prism driving device 10, so that an overall size of the prism driving device 10 can be smaller. In addition, due to characteristics of shapes of the support protrusion 4 and the groove 5, no reed is required for the support protrusion 4 and the groove 5, so that the fracture of the reed will not occur, ensuring reliability of the optical image stablization function.

Figure 4:
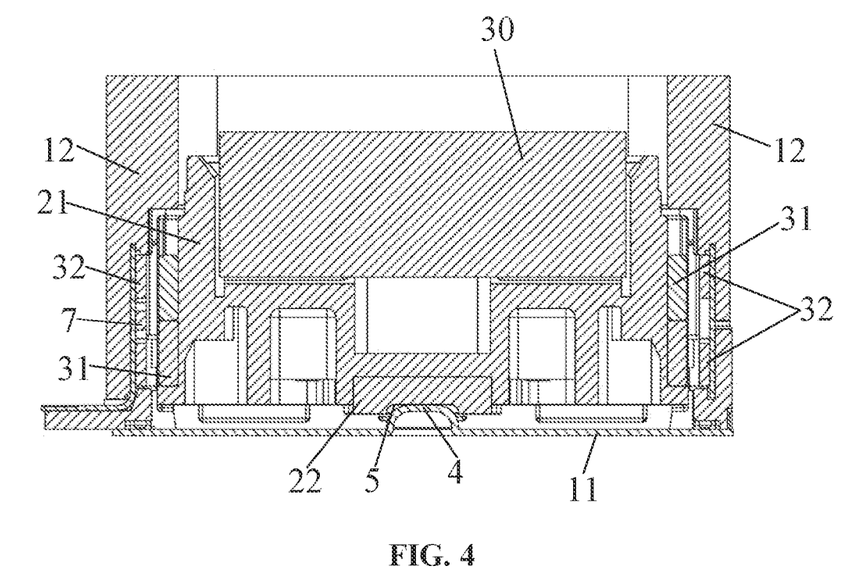
FIG. 4 is a cross-sectional view taken along a line B-B shown in FIG. 2 according to an embodiment of the present disclosure.
Figure 5:
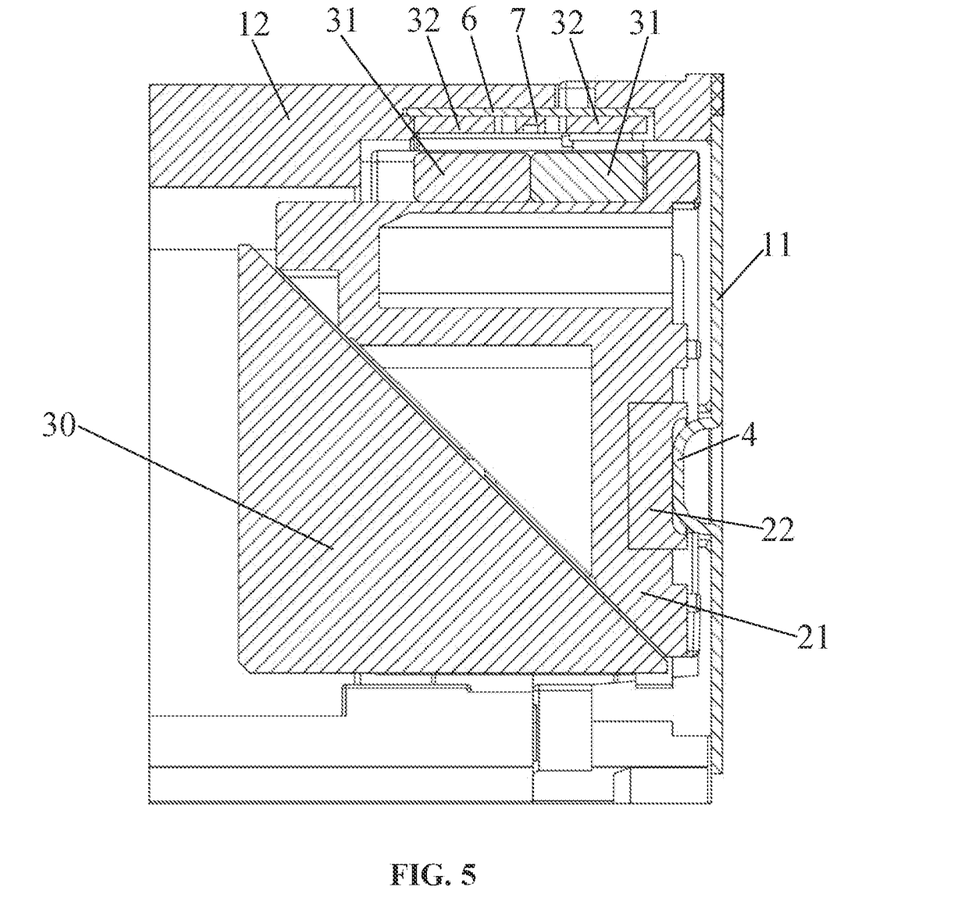
FIG. 5 is a cross-sectional view taken along a line C-C shown in FIG. 2 according to an embodiment of the present disclosure.
Figure 6:
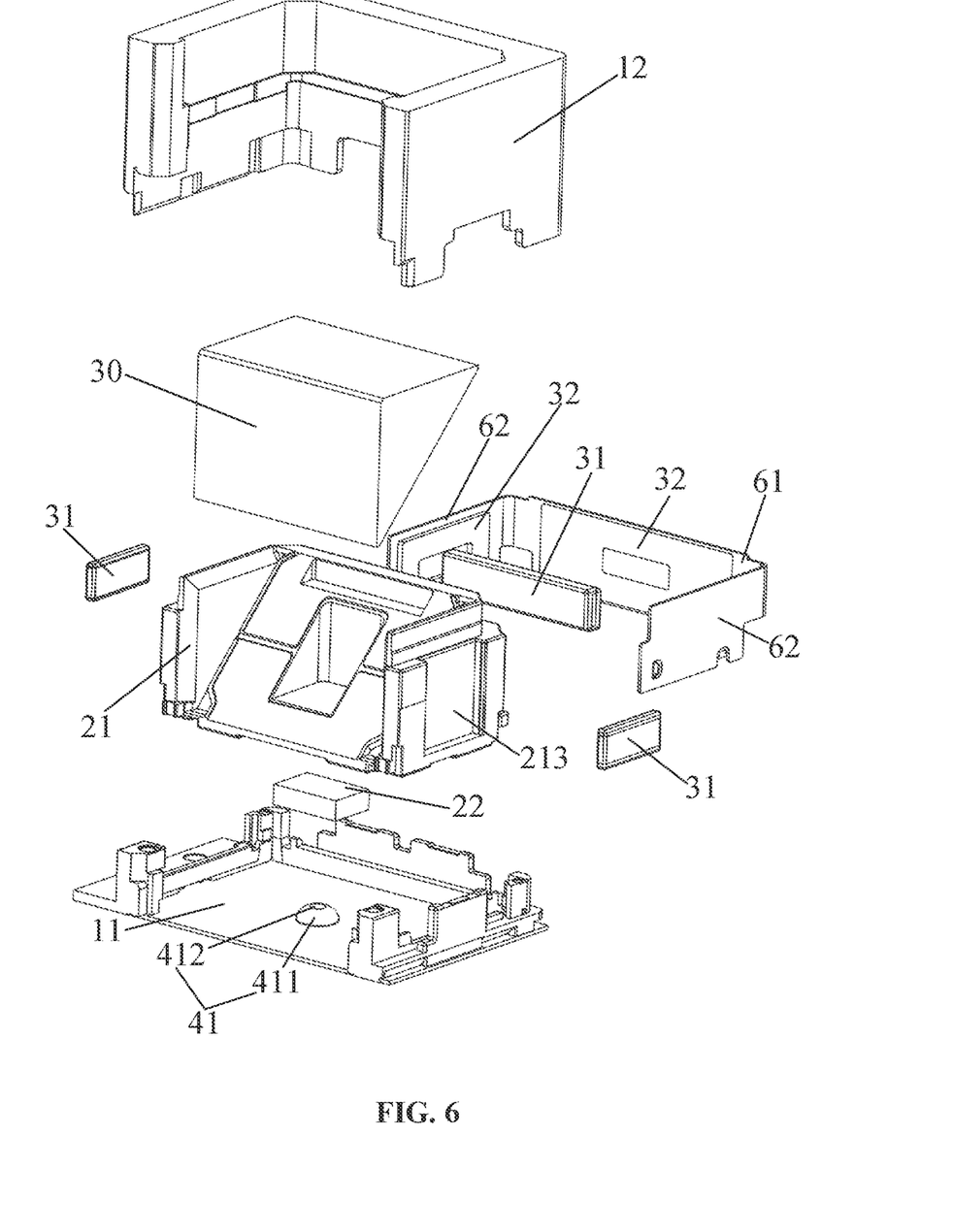
FIG. 6 is an exploded structure diagram of a prism driving device according to an embodiment of the present disclosure.

Optionally, as shown in FIG. 4 to FIG. 6, the prism holder 2 may include a holder body 21 and a support structure 22 disposed below the holder body 21. A gap is present between the holder body 21 and the housing assembly 1, so as to ensure that the holder body 21 can be universally moved relative to the housing assembly 1 with the support protrusion 4 as a fulcrum. One of the support protrusion 4 or the groove 5 is disposed on a side surface of the support structure 22 facing away from the holder body 21 (that is, a lower side of the support structure 22). That is to say, one of the support structure 22 or the housing assembly 1 is provided with the support protrusion 4, and the other one of the support structure 22 or the housing assembly 1 is provided with the groove 5. When the support protrusion 4 is disposed on the support structure 22, the support protrusion 4 and the support structure 22 may be integrally formed so as to improve the connection strength between the support protrusion 4 and the support structure 22.

Furthermore, as shown in FIG. 6, the housing assembly 1 includes a base plate 11 and a shell 12 disposed on the base plate 11, a cross section of the shell 12 is U-shaped, and both the electromagnetic driving assembly 3 and the prism holder 2 are disposed on the base plate 11 and are half surrounded by the shell 12. The support protrusion 4 is disposed on the base plate 11, and the groove 5 is disposed on the side surface of the support structure 22 facing away from the holder body 21. That is to say, the base plate 11 is provided with the support protrusion 4 extending upwardly from an upper surface of the base plate, and the side of the support structure 22 facing away from the holder body 21 is provided with the groove 5 extending inwardly from a surface of the support structure 22.

Optionally, the support structure 22 may be a magnet. In this case, the groove 5 disposed on the support structure 22 has magnetism, the base plate 11 is a metal plate, and the support protrusion 4 and the base plate 11 are integrally formed, so that the support protrusion 4 can be attracted by the groove 5 to achieve magnetic attraction connection between the support protrusion 4 and the groove 5. Optionally, in a process of manufacturing the base plate 11 and the support protrusion 4, a sheet metal may be prepared first, and then a bottom of the sheet metal is punched upwards with a tool to form the support protrusion 4 at a top surface of the sheet metal.

Optionally, in order to better adjust the tilt angle of the prism holder 2 in the holder body 21, the support structure 22 may be disposed at a position of a gravity center of the holder body 21 to facilitate the support protrusion 4 to better support the support structure 22 and the holder body 21, and to reduce the probability of the holder body 21 being tilted.

Figure 9:
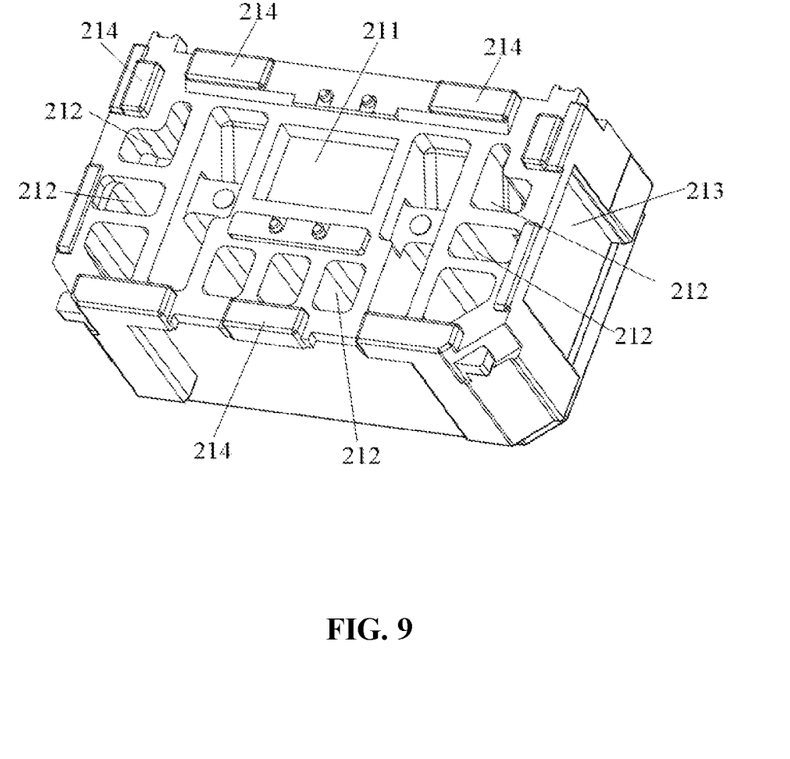
FIG. 9 is a structure diagram of a holder body according to an embodiment of the present disclosure.

Furthermore, as shown in FIG. 9, an accommodating groove 211 is disposed at the position of the gravity center of the holder body 21, and the support structure 22 is embedded and fixed in the accommodating groove 211 to prevent the support structure 22 from moving relative to the holder body 21. In addition, the accommodating groove 211 is provided so that the support structure 22 can be detachably connected to the holder body 21, thereby facilitating the replacement of the support structure 22.

Optionally, still referring to FIG. 9, a lower side of the holder body 21 is provided with a plurality of weight reduction slots 212. Specifically, a portion of the lower side of the holder body 21 where no accommodating groove 211 is provided is provided with the weight reduction slots 212. Moreover, weight reduction slots 212 located at one end of the holder body 21 are symmetrically disposed with weight reduction slots 212 located at the other end of the holder body 21, and an axis of symmetry of the weight reduction slots 212 located at the two ends passes through the accommodating groove 211. The weight reduction slots 212 located at one end of the holder body 21 are symmetrically disposed with the weight reduction slots 212 located at the other end of the holder body 21 so that balance between one end of the holder body 21 and the other end of the holder body 21 can be ensured, thereby preventing the holder body 21 from being tilted under the action of gravity.

Exemplarily, as shown in FIG. 9, an edge portion of the lower side of the holder body 21 is further provided with a plurality of stop blocks 214. The stop blocks 214 can define a maximum tilt angle when the holder body 21 is tilted, and when the holder body 21 is tilted to a certain angle, the stop blocks 214 come in contact with the base plate 11 and prevent the holder body 21 from being further tilted. Optionally, a height of the stop block 214 protruding from the holder body 21 is lower than a height of the support structure 22 protruding from the holder body 21. In this way, it can be ensured that the holder body 21 can be effectively driven.

Figure 7:
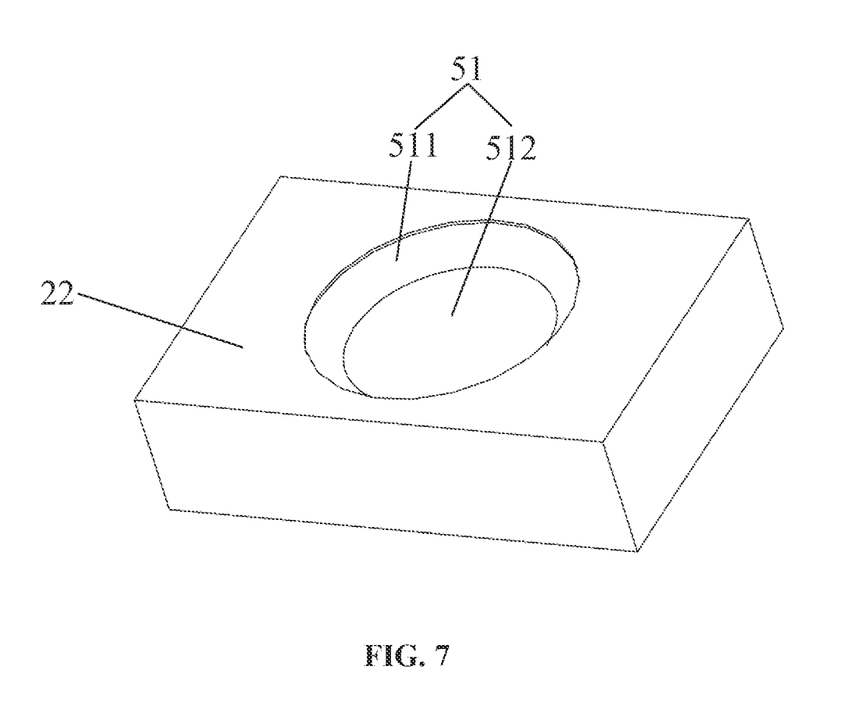
FIG. 7 is a schematic diagram of a support structure according to an embodiment of the present disclosure.

In this embodiment, as shown in FIG. 6 and FIG. 7, at least one of a top surface 41 of the support protrusion 4 or a groove bottom surface 51 of the groove 5 is a cambered surface so that the universal rotation of the support protrusion 4 relative to the groove 5 can be ensured. That is to say, both the top surface 41 of the support protrusion 4 and the groove bottom surface 51 of the groove 5 are cambered surfaces; or one of the top surface 41 of the support protrusion 4 or the groove bottom surface 51 of the groove 5 is a cambered surface, and the other one of the top surface 41 of the support protrusion 4 or the groove bottom surface 51 of the groove 5 is a flat surface, which is not limited in this embodiment. Exemplarily, when both the top surface 41 of the support protrusion 4 and the groove bottom surface 51 of the groove 5 may be the cambered surfaces, the top surface 41 of the support protrusion 4 may be a portion of a spherical surface, and the groove bottom surface 51 of the groove 5 may also be a portion of a spherical surface.

Furthermore, when both the top surface 41 of the support protrusion 4 and the groove bottom surface 51 of the groove 5 may be the cambered surfaces, as shown in FIG. 6, the top surface 41 may include a first top surface 411 and a second top surface 412, the first top surface 411 and the second top surface 412 both have an arc shape, and a size of the first top surface 411 is greater than a corresponding size of the second top surface 412. The size of the first top surface 411 may be a circumference of the first top surface 411, a chord length of the first top surface 411 or a radius of a sphere where the first top surface 411 is located. The size of the second top surface 412 may be a circumference of the second top surface 412, a chord length of the second top surface 412 or a radius of a sphere where the second top surface 412 is located. The size of the first top surface 411 being greater than the corresponding size of the second top surface 412 refers to that the circumference of the first top surface 411 is greater than the circumference of the second top surface 412, or the radius of the sphere where the first top surface 411 is located is greater than the radius of the sphere where the second top surface 412 is located.

As shown in FIG. 7, the groove bottom surface 51 includes a first bottom surface 511 and a second bottom surface 512, and a size of the first bottom surface 511 is greater than a corresponding size of the second bottom surface 512. The size of the first bottom surface 511 may be a circumference of the first bottom surface 511, a chord length of the first bottom surface 511 or a radius of a sphere where the first bottom surface 511 is located. The size of the second bottom surface 512 may be a circumference of the second bottom surface 512, a chord length of the second bottom surface 512 or a radius of a sphere where the second bottom surface 512 is located. The first top surface 411 can be sucked into the first bottom surface 511, and the second top surface 412 can be sucked into the second bottom surface 512, that is, the size of the first top surface 411 is consistent with the size of the first bottom surface 511, and the size of the second top surface 412 is consistent with the size of the second bottom surface 512. When the second top surface 412 is in contact with the second bottom surface 512, the first top surface 411 can be in contact with the first bottom surface 511 so that the stability of the support protrusion 4 universally rotating relative to the groove 5 can be ensured.

Figure 3:
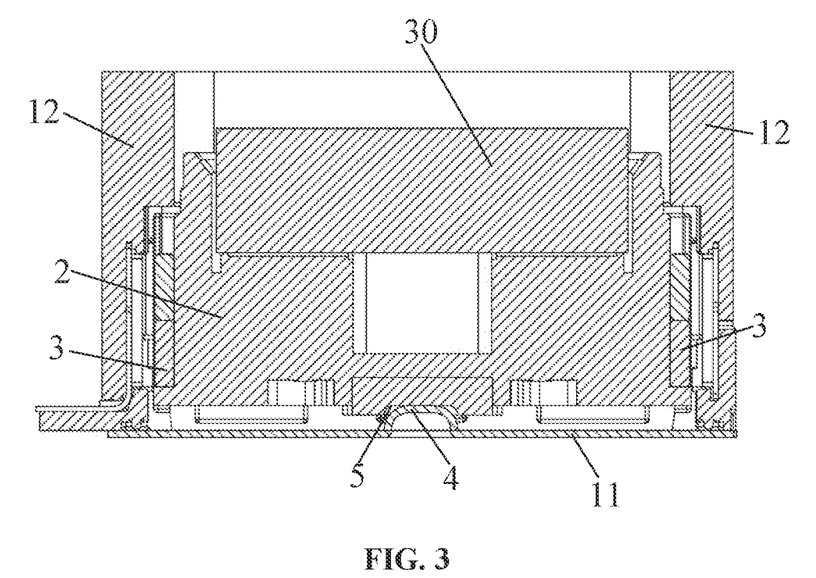
FIG. 3 is a cross-sectional view taken along a line A-A shown in FIG. 2 according to an embodiment of the present disclosure.

Optionally, as shown in FIG. 3, the electromagnetic driving assembly 3 is disposed around the prism holder 2, and the electromagnetic driving assembly 3 may include a magnet portion 31 and a coil portion 32 disposed opposite to the magnet portion 31. One of the magnet portion 31 or the coil portion 32 is disposed on the prism holder 2, the other one of the magnet portion 31 or the coil portion 32 is disposed on the housing assembly 1, and the magnet portion 31 and the coil portion 32 interact with each other to drive tilt movement of the prism holder 2 relative to the housing assembly 1. Optionally, one of the magnet portion 31 or the coil portion 32 is disposed on the holder body 21 of the prism holder 2, and the other one of the magnet portion 31 or the coil portion 32 is disposed on the shell 12 of the housing assembly 1.

Optionally, as shown in FIG. 5 and FIG. 6, the prism driving device 10 may further include a flexible circuit board 6, and the electromagnetic driving assembly 3 may include a plurality of magnet portions 31 and a plurality of coil portions 32, where the plurality of magnet portions 31 are in one-to-one correspondence with the plurality of coil portions 32, the plurality of coil portions 32 are disposed on the flexible circuit board 6, and a conductive structure in the flexible circuit board 6 supplies electric power to each coil portion 32. Optionally, when the prism driving device 10 includes one flexible circuit board 6, the flexible circuit board 6 may have a C-shape cross-section so that the flexible circuit board 6 surrounds the prism holder 2; and when the prism driving device 10 includes a plurality of flexible circuit boards 6, the plurality of flexible circuit boards 6 may be disposed on different side surfaces of the prism holder 2.

Furthermore, as shown in FIG. 6, the flexible circuit board 6 may include a first board piece 61 and two second board pieces 62 respectively connected to two ends of the first board piece 61, the first board piece 61 is disposed at a rear side of the prism holder 2, the two second board pieces 62 are respectively disposed at a left side and a right side of the prism holder 2, and the first board piece 61 and the two second board pieces 62 are both provided with the coil portion 32. Exemplarily, the electromagnetic driving assembly 3 may include three magnet portions 31 and three coil portions 32, where the three coil portions 32 are respectively disposed on the first board piece 61 and the two second board pieces 62, and the three magnet portions 31 are respectively disposed on the rear side, the left side and the right side of the prism holder 2. The rear side, the left side and the right side of the prism holder 2 may be provided with magnet grooves 213 for placing the magnet portions 31 so as to prevent the magnet portions 31 from moving.

Figure 8:
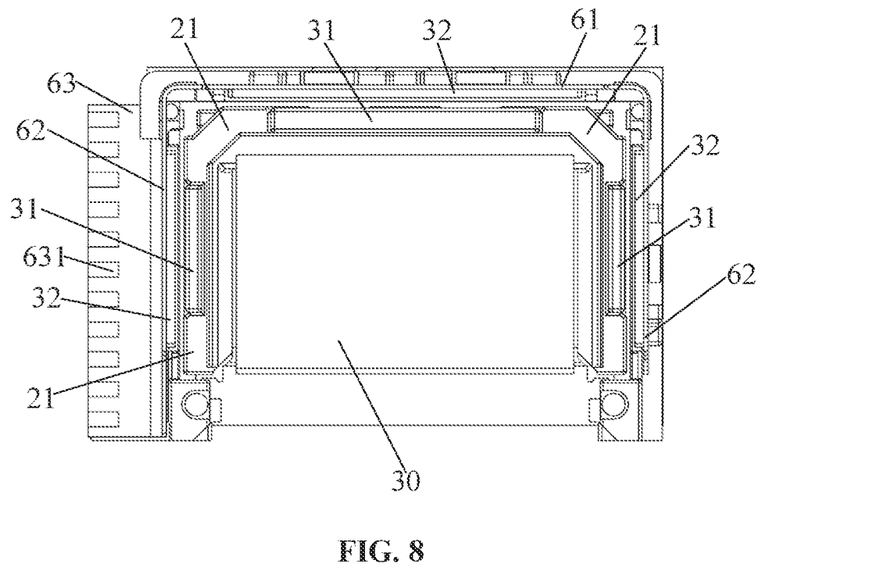
FIG. 8 is a schematic diagram of a portion of the prism driving device according to an embodiment of the present disclosure.

Furthermore, as shown in FIG. 8, the flexible circuit board 6 may further include a connecting plate 63 which bends and extends from a lower edge of any one of the second board pieces 62, and a surface of the connecting plate 63 arranges a row of gold fingers. The gold fingers 631 are electrically connected to an external circuit to supply current to the coil portion 32 through the second board pieces 62 and the first board piece 61.

In this embodiment, as shown in FIG. 4 and FIG. 5, the prism driving device 10 further includes one or more Hall effect detectors 7 disposed on the flexible circuit board 6. The Hall effect detector 7 is used to detect a magnetic change in the magnet portion 31 so as to determine a rotation angle of the magnet portion 31. A magnetic field is generated with the moving of the magnet portion 31, the Hall effect detector 7 detects the magnetic field and transmits a Hall signal to a controller IC, and the IC controls a magnitude of electric energy supplied to the coil portion 32 to adjust the position of the prism holder 2. In this way, a feedback control system is implemented to control an angle of the universal rotation of the prism driving device 10.

The above embodiments describe only the basic principles and characteristics of the present disclosure and the present disclosure is not limited to the above embodiments. Various modifications and changes may be made in the present disclosure without departing from the spirit and scope of the present disclosure. These modifications and changes fall within the scope of the present disclosure. The scope of the present disclosure is defined by the appended claims and equivalents thereof.

What is claimed is:

1. A prism driving device, comprising:
    a housing assembly;
    a prism holder disposed in the housing assembly in an angle adjustable manner; and
    an electromagnetic driving assembly comprising a magnet portion and a coil portion disposed opposite to the magnet portion,
    wherein one of the magnet portion or the coil portion is disposed on the prism holder, the other one of the magnet portion or the coil portion is disposed on the housing assembly, and the electromagnetic driving assembly is configured to adjust a tilt angle of the prism holder;
    wherein one of the housing assembly or the prism holder is provided with a support protrusion and the other one of the housing assembly or the prism holder is provided with a groove, one of the support protrusion or the groove is a magnet and the other one of the support protrusion or the groove is another magnet or a metal so that at least a portion of the support protrusion is magnetically sucked into the groove, and a tilt angle of the prism holder relative to the housing assembly is adjustable through the support protrusion and the groove which are in contact with each other.

2. The prism driving device of claim 1, wherein the prism holder comprises a holder body and a support structure disposed below the holder body, a gap is present between the holder body and the housing assembly, and one of the support protrusion or the groove is disposed on a side surface of the support structure facing away from the holder body.

3. The prism driving device of claim 2, wherein the housing assembly comprises a base plate and a shell located on the base plate, the support protrusion is disposed on the base plate, and the groove is disposed on the side surface of the support structure facing away from the holder body.

4. The prism driving device of claim 3, wherein the support structure is a magnet, the base plate is a metal plate, and the support protrusion and the base plate are integrally formed.

5. The prism driving device of claim 4, wherein the holder body is provided with an accommodating groove, and the support structure is fixed in the accommodating groove.

6. The prism driving device of claim 5, wherein at least one of a top surface of the support protrusion or a groove bottom surface of the groove is a cambered surface.

7. The prism driving device of claim 5, wherein a lower side of the holder body is provided with a plurality of weight reduction slots, and the weight reduction slots are symmetrically disposed on two ends of the holder body.

8. The prism driving device of claim 4, wherein at least one of a top surface of the support protrusion or a groove bottom surface of the groove is a cambered surface.

9. The prism driving device of claim 4, wherein a lower side of the holder body is provided with a plurality of weight reduction slots, and weight reduction slots are symmetrically disposed on two ends of the holder body.

10. The prism driving device of claim 3, wherein at least one of a top surface of the support protrusion or a groove bottom surface of the groove is a cambered surface.

11. The prism driving device of claim 3, wherein a lower side of the holder body is provided with a plurality of weight reduction slots, and the weight reduction slots are symmetrically disposed on two ends of the holder body.

12. The prism driving device of claim 2, wherein a lower side of the holder body is provided with a plurality of weight reduction slots, and the weight reduction slots are symmetrically disposed on two ends of the holder body.

13. The prism driving device of claim 2, wherein at least one of a top surface of the support protrusion or a groove bottom surface of the groove is a cambered surface.

14. The prism driving device of claim 2, wherein the electromagnetic driving assembly surrounds the prism holder.

15. The prism driving device of claim 1, wherein at least one of a top surface of the support protrusion or a groove bottom surface of the groove is a cambered surface.

16. The prism driving device of claim 15, wherein the top surface comprises a first top surface and a second top surface, and a size of the first top surface is larger than a corresponding size of the second top surface; the groove bottom surface comprises a first bottom surface and a second bottom surface, and a size of the first bottom surface is larger than a corresponding size of the second bottom surface; and the first top surface is capable of being sucked into the first bottom surface, and the second top surface is capable of being sucked into the second bottom surface.

17. The prism driving device of claim 1, wherein the electromagnetic driving assembly surrounds the prism holder.

18. The prism driving device of claim 17, further comprising a flexible circuit board, wherein the electromagnetic driving assembly comprises a plurality of magnet portions and a plurality of coil portions, and the plurality of coil portions are disposed in the flexible circuit board.

19. The prism driving device of claim 18, wherein the flexible circuit board comprises a first board piece and two second board pieces respectively connected to two ends of the first board piece, the first board piece is disposed at a rear side of the prism holder, the two second board pieces are respectively disposed at a left side and a right side of the prism holder, and the first board piece and the two second board pieces are both provided with the plurality of coil portions.

20. The prism driving device of claim 19, wherein the flexible circuit board further comprises a connecting plate which bends and extends from a lower edge of a second board piece, and a surface of the connecting plate arranges a row of gold fingers.

\* \* \* \* \*